(12) United States Patent
Zhang et al.

(10) Patent No.: US 10,739,508 B2
(45) Date of Patent: Aug. 11, 2020

(54) LIGHT GUIDE PLATE WITH TOOTHED LIGHT INCIDENT SURFACE

(71) Applicants: NICROTEK CO., LTD., Suzhou, Jiangsu Province (CN); SOOCHOW UNIVERSITY, Suzhou, Jiangsu Province (CN); SVG OPTRONICS, CO., LTD, Suzhou, Jiangsu (CN)

(72) Inventors: Heng Zhang, Suzhou (CN); Zongbao Fang, Suzhou (CN); Zhijian Zhu, Suzhou (CN); Linsen Chen, Suzhou (CN)

(73) Assignees: NICROTEK CO., LTD., Suzhou, Jiangsu Province (CN); SOOCHOW UNIVERSITY, Suzhou, Jiangsu Province (CN)

( * ) Notice: Subject to any disclaimer, the term of this patent is extended or adjusted under 35 U.S.C. 154(b) by 0 days.

(21) Appl. No.: 16/475,376

(22) PCT Filed: Dec. 22, 2017

(86) PCT No.: PCT/CN2017/117941
§ 371 (c)(1),
(2) Date: Jul. 1, 2019

(87) PCT Pub. No.: WO2018/121424
PCT Pub. Date: Jul. 5, 2018

(65) Prior Publication Data
US 2019/0339434 A1 Nov. 7, 2019

(30) Foreign Application Priority Data
Dec. 30, 2016 (CN) .......................... 2016 1 1270171

(51) Int. Cl.
*G02B 6/00* (2006.01)
*F21V 8/00* (2006.01)

(52) U.S. Cl.
CPC ........... *G02B 6/002* (2013.01); *G02B 6/0016* (2013.01); *G02B 6/0036* (2013.01); *G02B 6/0038* (2013.01)

(58) Field of Classification Search
CPC .... G02B 6/002; G02B 6/0016; G02B 6/0018; G02B 6/0036; G02B 6/0038
See application file for complete search history.

(56) References Cited

U.S. PATENT DOCUMENTS

2007/0139968 A1   6/2007   Chang
2007/0159848 A1   7/2007   Yang et al.
(Continued)

FOREIGN PATENT DOCUMENTS

CN    101126859 A    2/2008
CN    100445837 C    12/2008
(Continued)

*Primary Examiner* — Anne M Hines
(74) *Attorney, Agent, or Firm* — Cheng-Ju Chiang

(57) ABSTRACT

A light guide plate with a toothed light incident surface includes a light guide plate body. A first plate surface and a second plate surface are formed at two opposite surfaces of the light guide plate body, respectively. Micro-structure points are provided and distributed randomly and densely on the first plate surface. Among multiple side surfaces of the light guide plate body, at least one side surface is provided with a plurality of first teeth arranged sequentially in parallel. The first teeth extend along a height direction of the light guide plate body. A first groove is arranged between every two neighboring first teeth. The light incident surface is formed by the plurality of first teeth and the plurality of first grooves.

4 Claims, 7 Drawing Sheets

(56) References Cited

U.S. PATENT DOCUMENTS

| | | | | |
|---|---|---|---|---|
| 2010/0142225 A1* | 6/2010 | Kurihara | ............... | G02B 6/0016 |
| | | | | 362/621 |
| 2012/0081926 A1* | 4/2012 | Yu | ........................ | G02B 6/0036 |
| | | | | 362/619 |
| 2013/0027972 A1 | 1/2013 | Suma | | |
| 2014/0211501 A1 | 7/2014 | Tseng | | |
| 2014/0355300 A1 | 12/2014 | Chang et al. | | |
| 2017/0176663 A1* | 6/2017 | Furuta | .................... | G02B 6/002 |

FOREIGN PATENT DOCUMENTS

| CN | 102156320 | A | 8/2011 |
|---|---|---|---|
| CN | 202057825 | U | 11/2011 |
| CN | 203799044 | U | 8/2014 |
| CN | 104235637 | A | 12/2014 |
| CN | 104914499 | A | 9/2015 |
| CN | 105467505 | A | 4/2016 |
| CN | 106016188 | A | 10/2016 |
| CN | 107065060 | A | 8/2017 |

* cited by examiner

LIGHT GUIDE PLATE WITH TOOTHED LIGHT INCIDENT SURFACE

CROSS REFERENCE TO RELATED APPLICATIONS

This application is a 35 U.S.C. § 371 National Phase conversion of International (PCT) Patent Application No. PCT/CN2017/117941, filed on Dec. 22, 2017, which claims the priority of Chinese Patent Application No. 201611270171.1, filed on Dec. 30, 2016. The contents of the above-identified applications are incorporated herein by reference. The PCT application was filed and published in Chinese.

TECHNICAL FIELD

The present invention relates to light guide plates, and more particularly to a light guide plate with a toothed light incident surface.

BACKGROUND ART

The light guide plate is made of an optical grade acrylic or PC sheet, and then light guiding micro-structure points of a high-tech material with extremely high reflectivity and no light absorption are printed on a bottom surface of the optical grade acrylic sheet. Currently, the light guide plate with a micro-structure on one side is more common in the market, and a dot structure is arranged on one side. The main problem is that the normal shielding performance for bright spots, stripes, black and white spots is poor. Also, there is a low light energy density, affecting the brightness of light.

In order to solve the above problems, some technologies have appeared. For example, in Chinese patent applications with application Nos. of 201310243997.9, 201510312037.2, 201610442266.0, the above technical problems are solved by setting a surface of the light guide plate with a zigzag surface. For example, Chinese patent application No. 201510312037.2 discloses a novel light guide plate having at least one V-shaped groove with a V-shaped cross section, the V-shaped groove has a first side surface and a second side surface, the first side surface and the second side surface form an angle therebetween, the angle is an obtuse angle, so that the light, after being reflected by the V-shaped groove, exits in the direction perpendicular to the top surface of the light guide plate. This technology enables the original irregular divergent light, after being reflected by the V-shaped groove, to exit in the direction perpendicular to the top surface of the light guide plate wholly, effectively improving the utilization of the light source, improving the intensity of the light reflected from the light guide plate, and homogenizing the brightness of the light. Therefore, the light source energy can be well mapped on the products using the light guide plate.

Technical Problem

Although the prior arts have solved the problem of light energy at the light exiting points, there are still problems of low energy density, hot spot and wide blank area at the light incident points.

Technical Solution

In view of the shortcomings of the prior arts, the object of the present invention is to provide a light guide plate with a toothed light incident surface, in order to solve the problems of low energy density, hot spot and wide blank area at the light incident points.

In order to achieve the above object, the technical solution of the present invention is as follows:

A light guide plate with a toothed light incident surface includes a light guide plate body. A first plate surface and a second plate surface are formed at two opposite surfaces of the light guide plate body, respectively. The first plate surface is provided with a plurality of micro-structure points arranged in an array. A light incident side surface of the light guide plate body is provided with a plurality of first teeth arranged sequentially in parallel. The first teeth extend along a height direction of the light guide plate body. A first groove is arranged between every two neighboring first teeth. The light incident surface is formed by the plurality of first teeth and the plurality of first grooves.

Further, the first teeth and the first grooves each have a triangular cross section.

Further, the second plate surface is provided with a plurality of second teeth arranged sequentially in parallel, and the second teeth are parallel to the side surface. A second groove is arranged between every two neighboring second teeth. A light exiting surface is formed by the plurality of second teeth and the plurality of second grooves.

Further, the second teeth and the second grooves each have a triangular cross section.

Further, the points on the first plate surface are indentations.

Further, the second plate surface is provided with a protruding ridge. The protruding ridge has a right-angled trapezoidal cross section. An inclined surface of the protruding ridge is connected to the light exiting surface, and a vertical surface of the protruding ridge is connected to the side surface. The first teeth and the first grooves extend along the vertical surface and are connected to a top surface of the protruding ridge.

Advantageous Effects

The light guide plate with the toothed light incident surface described above is provided with first teeth and first grooves on at least one side surface of the light guide plate body, and the light incident surface is formed by the first teeth and the first grooves, thereby effectively solving the technical problem of low light energy density at the light incident points. Therefore, the present invention has the following advantages over the prior arts: the contact area of the light incident surface is increased, so that the light energy entering the light guide plate body from the light incident surface is increased, the contact angle between the LEDs and the light incident surface of the light guide plate body is improved simultaneously, thereby reducing the hot spot phenomenon at the light incident points and reducing the width of the blank area.

DETAILED DESCRIPTION OF PREFERRED EMBODIMENTS

In order to make the objects, technical solutions and advantages of the present invention more clear, the embodiments of the present invention will be further described with reference to the accompanying drawings.

First Embodiment

Figure 1A:
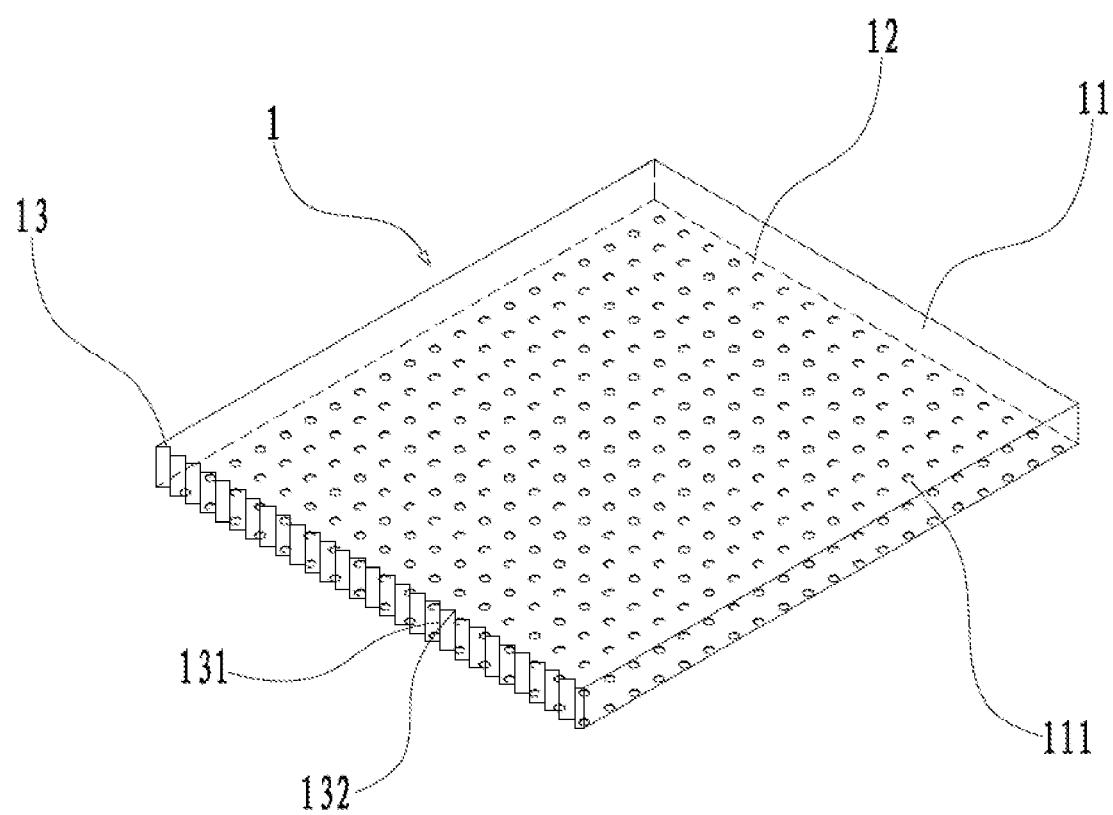
FIG. 1A is a perspective view of a light guide plate with a toothed light incident surface in a first embodiment of the present invention.
Figure 1B:
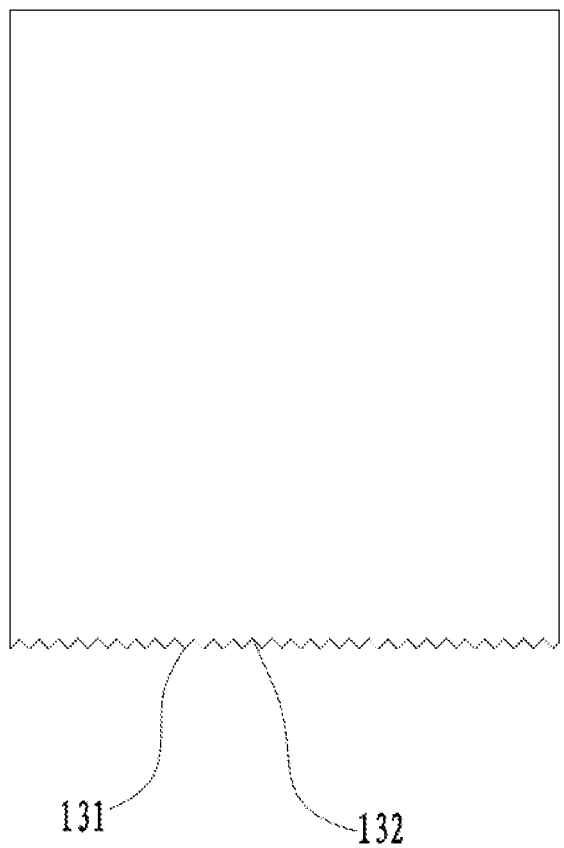
FIG. 1B is a top plan view of the light guide plate with the toothed light incident surface in the first embodiment of the present invention.

As shown in FIG. 1A to FIG. 1B, a light guide plate with a toothed light incident surface mainly includes a light guide plate body 1. A first plate surface 11 and a second plate surface 12 are formed at two opposite surfaces of the light guide plate body 1, respectively. The first plate surface 11 are provided with micro-structure points 111 which are distributed randomly and densely. Among multiple side surfaces 13 of the light guide plate body 1, one side surface 13 is provided with a plurality of first teeth 131 which are arranged sequentially in parallel. The first teeth 131 extend along a height direction of the light guide plate body 1. A first groove 132 is arranged between every two neighboring first teeth 131. The light incident surface is formed by the plurality of first teeth 131 and the plurality of first grooves 132.

The light guide plate with the toothed light incident surface according to this embodiment can increase the contact area of the light incident surface, thereby increasing the light energy entering the light guide plate body from the light incident surface, improving the contact angle between the LEDs and the light incident surface of the light guide plate body simultaneously, reducing hot spot phenomenon at the light incident points, and reducing the width of the blank area.

In order to verify the above technical effects, specific experimental data is given below. The experimental conditions are in accordance with existing standards for light guide plate, and are not described herein.

TABLE 1

| Test points | Prior art (with unimproved light incident surface) | Present invention (with improved light incident surface) |
| --- | --- | --- |
| 1 | 6101 | 6406 |
| 2 | 6155 | 6494 |
| 3 | 5819 | 6168 |
| 4 | 6499 | 6810 |
| 5 | 6405 | 6770 |
| 6 | 6123 | 6466 |
| 7 | 6510 | 6901 |
| 8 | 5979 | 6326 |
| 9 | 6001 | 6325 |
| 10 | 6196 | 6537 |
| 11 | 5764 | 6098 |
| 12 | 6245 | 6595 |
| 13 | 6345 | 6707 |
| Brightness at point 5 | 6322 | 6669 |
| Brightness at point 13 | 6172 | 6508 |
| Uniformity at point 5 | 90.94% | 91.66% |
| Uniformity at point 13 | 87.35% | 88.37% |

Specifically, the first teeth 131 and the first grooves 132 described above may have a triangular cross section, in order to further increase the light energy. The micro-structure points 111 on the first plate surface 11 may be indentations.

Second Embodiment

Figure 2A:
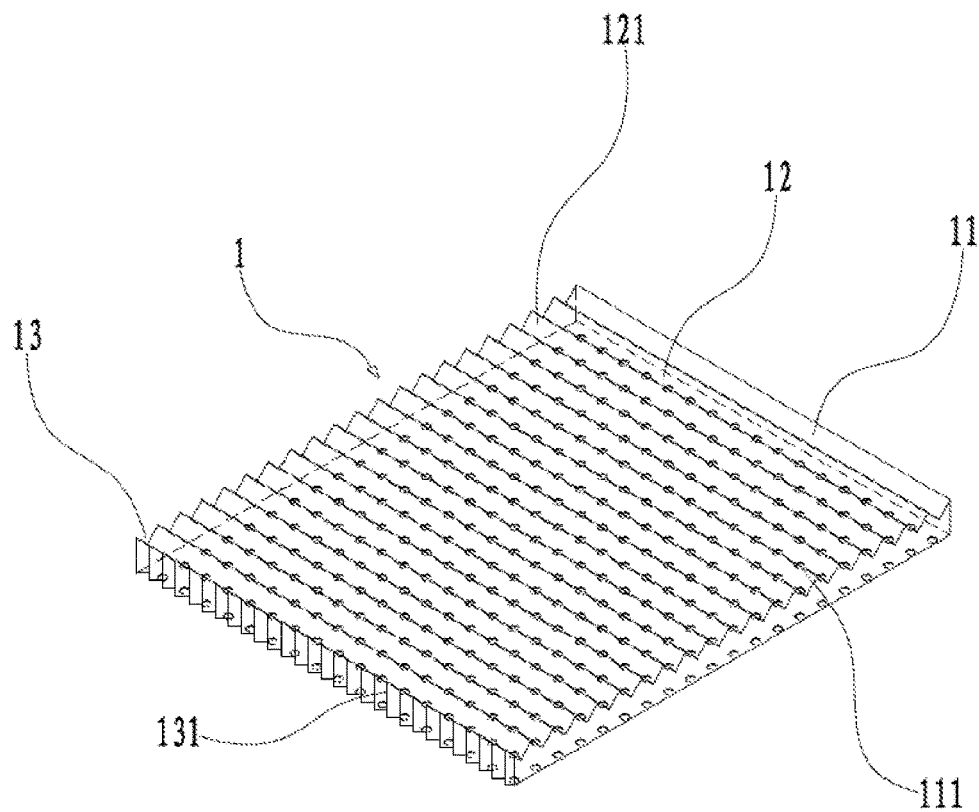
FIG. 2A is a perspective view of a light guide plate with a toothed light incident surface in a second embodiment of the present invention.
Figure 2B:
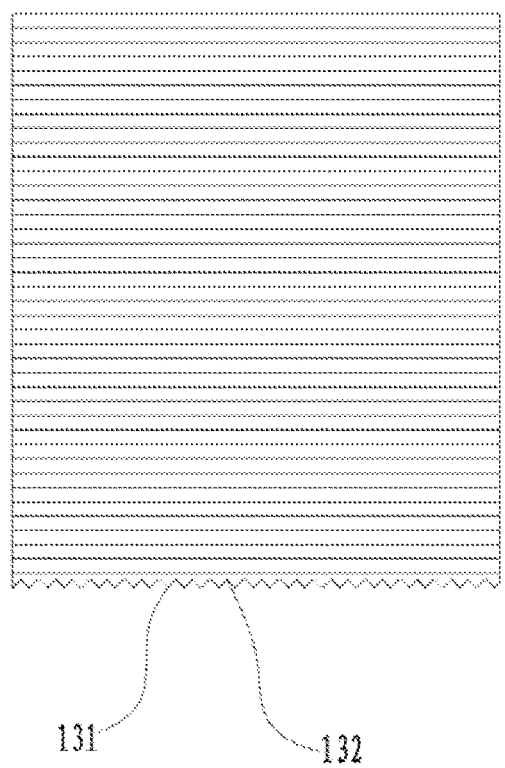
FIG. 2B is a top plan view of the light guide plate with the toothed light incident surface in the second embodiment of the present invention.
Figure 2C:
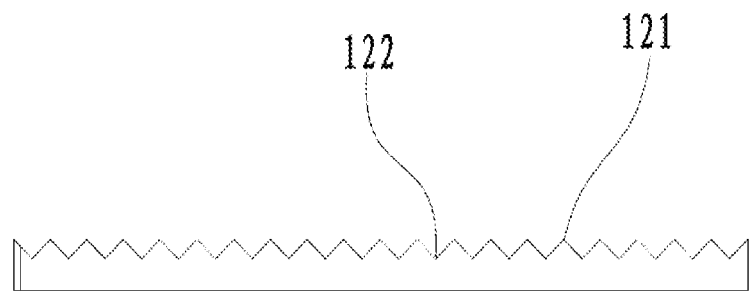
FIG. 2C is a side view of the light guide plate with the toothed light incident surface in the second embodiment of the present invention.

As shown in FIG. 2A to FIG. 2C, this embodiment is the same as the first embodiment, except that the second plate surface 12 is provided with a plurality of second teeth 121 which are arranged sequentially in parallel, and the second teeth 121 are parallel to the side surface 13. A second groove 122 is arranged between every two neighboring second teeth 121. The light exiting surface is formed by the plurality of second teeth 121 and the plurality of second grooves 122. In addition to the above effects, the light guide plate with the toothed light incident surface according to this embodiment can further increase the light energy by the double-sided structure. Specifically, the second teeth 121 and the second grooves 122 may have a triangular cross section, to further increase the light energy.

Third Embodiment

Figure 3A:
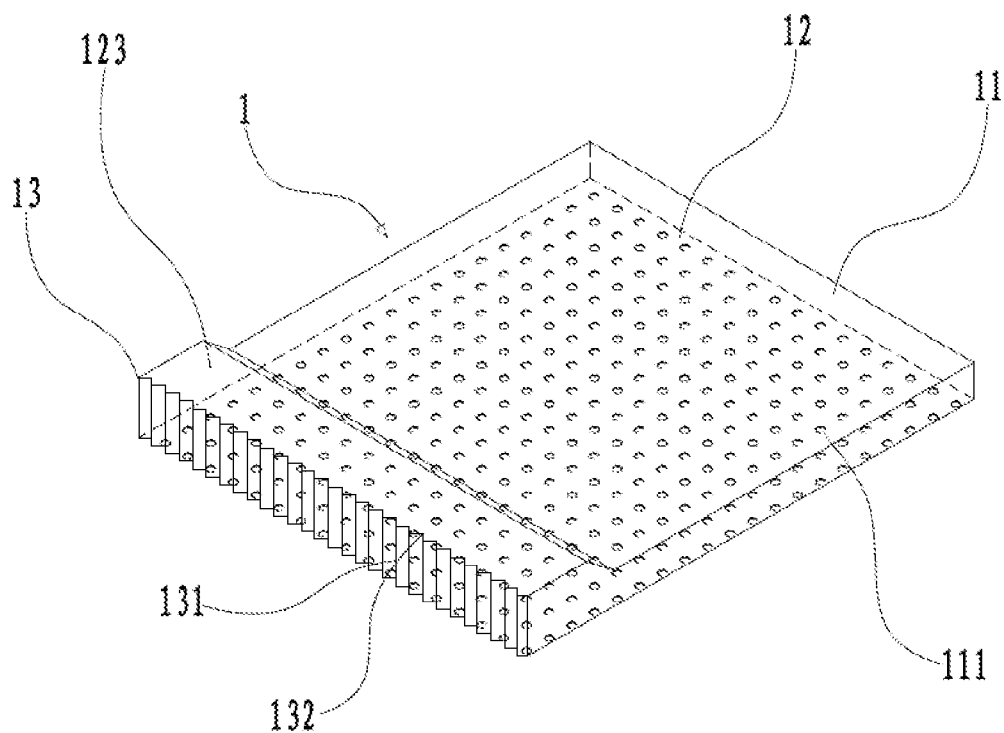
FIG. 3A is a perspective view of a light guide plate with a toothed light incident surface in a third embodiment of the present invention.
Figure 3B:
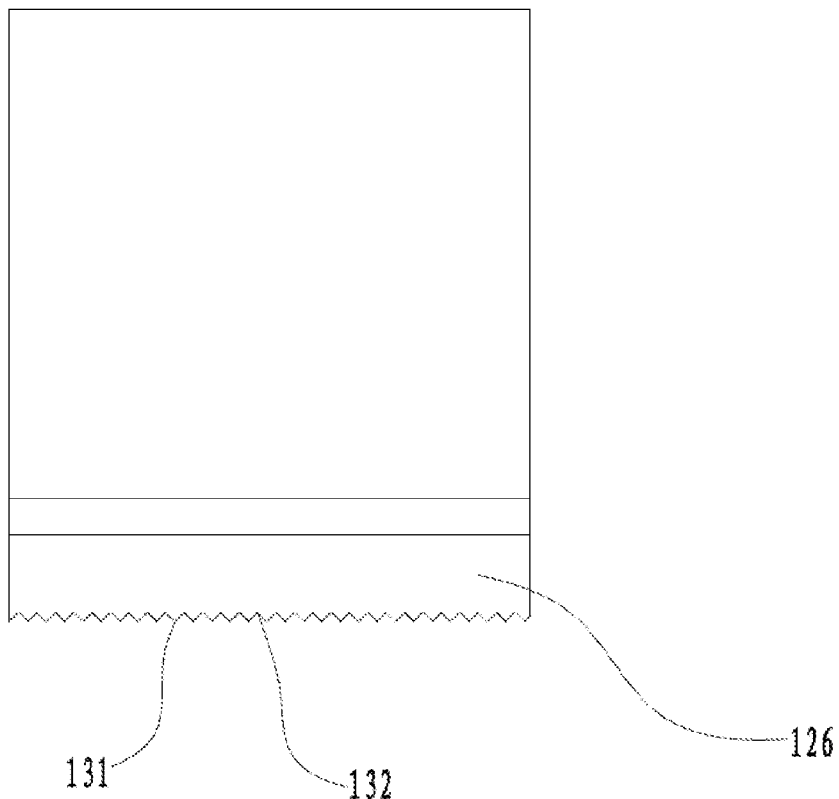
FIG. 3B is a top plan view of the light guide plate with the toothed light incident surface in the third embodiment of the present invention.
Figure 3C:
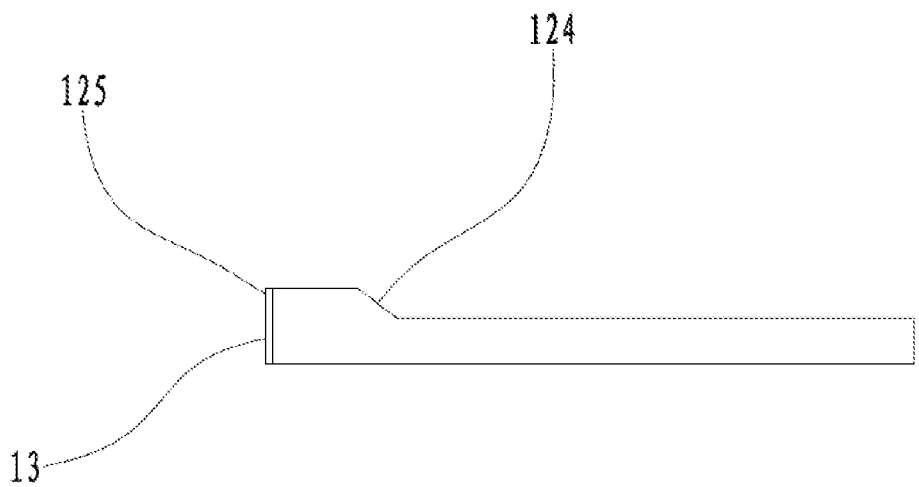
FIG. 3C is a side view of the light guide plate with the toothed light incident surface in the third embodiment of the present invention.

As shown in FIG. 3A to FIG. 3C, this embodiment is the same as the first embodiment, except that the second plate surface 12 is provided with a protruding ridge 123. The cross section of the protruding ridge 123 is a right-angled trapezoid, wherein an inclined surface 124 of the protruding ridge 123 is connected to the light exiting surface, a vertical surface 125 of the protruding ridge 123 is connected to the side surface 13, the first teeth 131 and the first grooves 132 extend along the vertical surface 125 and are connected to a top surface 126 of the protruding ridge 123. In addition to the above effects, the light guide plate with the toothed light incident surface according to this embodiment can increase the light energy entering the light guide plate from the side surface due to the provision of the protruding ridge, and the overall brightness of the light guide plate is increased by 5%-7%.

Fourth Embodiment

Figure 4A:
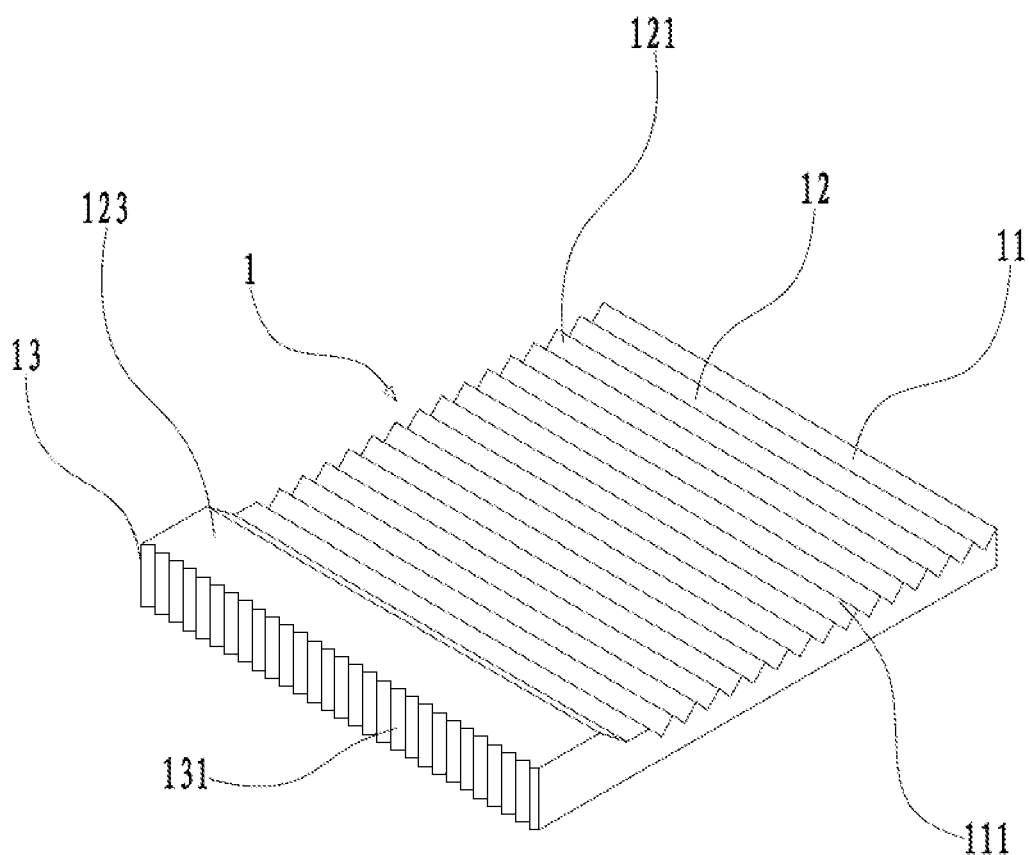
FIG. 4A is a perspective view of a light guide plate with a toothed light incident surface in a fourth embodiment of the present invention.
Figure 4B:
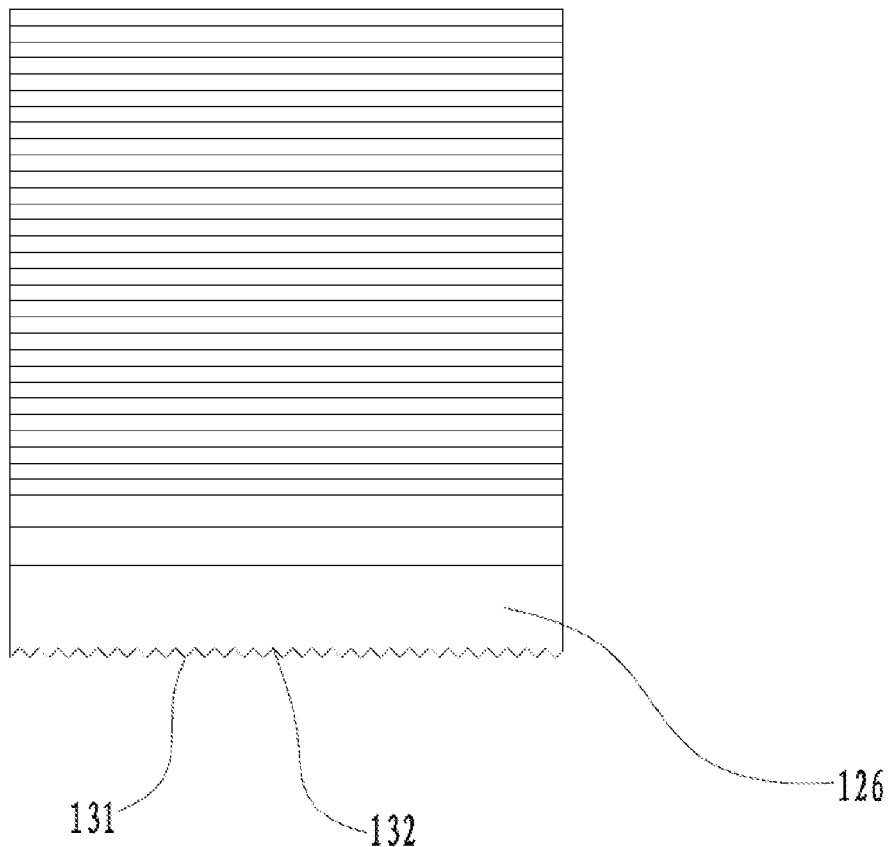
FIG. 4B is a top plan view of the light guide plate with the toothed light incident surface in the fourth embodiment of the present invention.
Figure 4C:
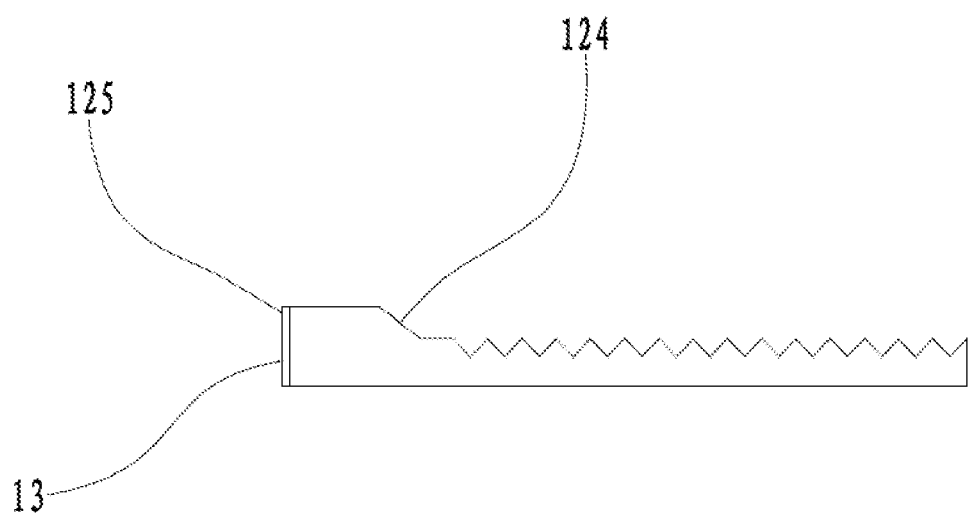
FIG. 4C is a side view of the light guide plate with the toothed light incident surface in the fourth embodiment of the present invention.

As shown in FIG. 4A to FIG. 4C, this embodiment is the same as the second embodiment, except that the second plate surface 12 is provided with a protruding ridge 123. The cross section of the protruding ridge 123 is a right-angled trapezoid, wherein an inclined surface 124 of the protruding ridge 123 is connected to the light exiting surface which is formed by the plurality of second teeth 121 and the plurality of second grooves 122, a vertical surface 125 of the protruding ridge 123 is connected to the side surface 13, the first teeth 131 and the first grooves 132 extend along the vertical surface 125 and are connected to a top surface 126 of the protruding ridge 123. In addition to the above effects, the light guide plate with the toothed light incident surface according to this embodiment can increase the light energy entering the light guide plate from the side surface due to the provision of the protruding ridge, and the overall brightness of the light guide plate is increased by 5%-7%.

In conclusion, the light guide plate with the toothed light incident surface according to the present invention is provided with first teeth and first grooves on at least one side surface of the light guide plate body, and the light incident surface is formed by the first teeth and the first grooves, thereby effectively solving the above technical problems. Therefore, the present invention has the following advantages over the prior arts: the contact area of the light incident surface is increased, so that the light energy entering the light guide plate body from the light incident surface is increased, the contact angle between the LEDs and the light incident surface of the light guide plate body is improved simultaneously, thereby reducing the hot spot phenomenon at the light incident points and reducing the width of the blank area.

The above are only the preferred embodiments of the present invention, and it should be noted that those skilled in the art can make various modifications and improvements without departing from the inventive concept of the present invention, and these should also be included in the scope of the present invention.

INDUSTRIAL APPLICABILITY

The light guide plate with the toothed light incident surface according to the present invention is provided with first teeth and first grooves on at least one side surface of the light guide plate body, and the light incident surface is formed by the first teeth and the first grooves, so that the contact area of the light incident surface is increased, thereby increasing the light energy entering the light guide plate body from the light incident surface, improving the contact angle between the LEDs and the light incident surface of the light guide plate body simultaneously, reducing the hot spot phenomenon at the light incident points and reducing the width of the blank area.

What is claimed is:

1. A light guide plate with a toothed light incident surface, comprising a light guide plate body, wherein a first plate surface and a second plate surface are formed at two opposite surfaces of the light guide plate body, respectively, the first plate surface is provided with a plurality of micro-structure points arranged in an array, a light incident side surface of the light guide plate body is provided with a plurality of first teeth arranged sequentially in parallel, the first teeth extend along a height direction of the light guide plate body, a first groove is arranged between every two neighboring first teeth, the light incident surface is formed by the plurality of first teeth and the plurality of first grooves;

wherein the second plate surface is provided with a plurality of second teeth arranged sequentially in parallel, and the second teeth are parallel to the light incident side surface, a second groove is arranged between every two neighboring second teeth, a light exiting surface is formed by the plurality of second teeth and the plurality of second grooves;

wherein the second plate surface is provided with a protruding ridge, the protruding ridge has a right-angled trapezoidal cross section and includes a vertical surface, a flat top surface and an inclined surface, the inclined surface of the protruding ridge is connected to the light exiting surface, the vertical surface of the protruding ridge is connected to the light incident side surface, the first teeth and the first grooves extend along the vertical surface and are connected to the flat top surface of the protruding ridge.

2. The light guide plate with the toothed light incident surface according to claim 1, wherein the first teeth and the first grooves each have a triangular cross section.

3. The light guide plate with the toothed light incident surface according to claim 1, wherein the second teeth and the second grooves each have a triangular cross section.

4. The light guide plate with the toothed light incident surface according to claim 1, wherein the micro-structure points on the first plate surface are indentations.

* * * * *